United States Patent
Sun et al.

(10) Patent No.: US 12,258,857 B2
(45) Date of Patent: Mar. 25, 2025

(54) METHOD TO DETERMINE DRILLING-INDUCED ROCK DAMAGE

(71) Applicant: SAUDI ARABIAN OIL COMPANY, Dhahran (SA)

(72) Inventors: Xuekai Sun, Beijing (CN); Christopher Ayadiuno, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 309 days.

(21) Appl. No.: 17/647,887

(22) Filed: Jan. 13, 2022

(65) Prior Publication Data

US 2023/0203943 A1 Jun. 29, 2023

(30) Foreign Application Priority Data

Dec. 24, 2021 (CN) .......................... 202111603470.3

(51) Int. Cl.
*E21B 49/00* (2006.01)
*G01V 1/50* (2006.01)

(52) U.S. Cl.
CPC .............. *E21B 49/00* (2013.01); *G01V 1/50* (2013.01); *G01V 2210/1299* (2013.01); *G01V 2210/1429* (2013.01); *G01V 2210/47* (2013.01); *G01V 2210/6222* (2013.01)

(58) Field of Classification Search
CPC ........... E21B 47/14; E21B 47/00; G01V 1/48; G01V 1/46; G01V 2200/16; G01V 2210/6222; G01V 2210/47; G01V 2210/1429; G01V 2210/1299; G01V 1/50
See application file for complete search history.

(56) References Cited

U.S. PATENT DOCUMENTS

| | | |
|---|---|---|
| 6,614,360 B1 | 9/2003 | Leggett, III et al. |
| 7,334,651 B2 | 2/2008 | Wu |
| 7,660,195 B2 * | 2/2010 | Mandal ................... G01V 1/48 |
| | | 181/102 |
| 8,811,114 B2 | 8/2014 | Geerits et al. |
| 10,544,668 B2 | 1/2020 | Hori et al. |

(Continued)

FOREIGN PATENT DOCUMENTS

| | | |
|---|---|---|
| CN | 107605470 A * | 1/2018 |
| WO | 2017/210231 A1 | 12/2017 |

OTHER PUBLICATIONS

CN-107605470-A (machine translation) (Year: 2018).*

(Continued)

*Primary Examiner* — Luke D Ratcliffe
*Assistant Examiner* — Christopher Richard Walker
(74) *Attorney, Agent, or Firm* — Osha Bergman Watanabe & Burton LLP (57) ABSTRACT

Methods and systems for determining a drilling-induced rock damage map are disclosed. The method includes obtaining a sonic dataset, including sonic waveforms recorded at a plurality of source-receiver separations for a plurality of source positions along an axis of a wellbore. The method further includes determining a log of a first metric using the sonic dataset and determining a map of a second metric using the sonic dataset. The method still further includes determining the drilling-induced rock damage map based, at least in part, on the log of the first metric and the map of the second metric.

18 Claims, 6 Drawing Sheets

(56) References Cited

U.S. PATENT DOCUMENTS

| | | | | |
|---|---|---|---|---|
| 2002/0116128 | A1* | 8/2002 | Sinha | G01V 1/48 |
| | | | | 702/6 |
| 2006/0235617 | A1* | 10/2006 | Sinha | G01V 1/50 |
| | | | | 702/6 |
| 2013/0255943 | A1* | 10/2013 | Yeh | E21B 43/045 |
| | | | | 166/305.1 |
| 2020/0301036 | A1* | 9/2020 | Ramfjord | G01V 1/50 |

OTHER PUBLICATIONS

Hornby ("Tomographic reconstruction of near-borehole slowness using refracted borehole sonic arrivals", 1993. Geophysics, vol. 58, pp. 1726-1738) (Year: 1993).*

Close, D., et al., "The Sound of Sonic: A Historical Perspective and Introduction to Acoustic Logging", CSEG Recorder, May 2009, pp. 34-43 (10 pages).

Hornby, Brian E., "Tomographic reconstruction of near-borehole slowness using refracted borehole sonic arrivals", Geophysics, Society of Exploration Geophysicists, vol. 58, No. 12, Dec. 1993, pp. 1726-1738 (13 pages).

Kimball, Christopher V. and Thomas L. Marzetta, "Semblance processing of borehole acoustic array data", Geophysics, Society of Exploration Geophysicists, vol. 49, No. 3, Mar. 1984, pp. 274-281 (8 pages).

Sun, Xuekai, et al., "Improving the Accuracy of Acoustic Velocity Estimation from Monopole Waveforms", SEG 2020: 2nd Borehole Geophysics Workshop, Society of Exploration Geophysicists, Nov. 2020, pp. 37-39 (3 pages).

Tang, Xiao-Ming, et al., "A curve-fitting technique for determining dispersion characteristics of guided elastic waves", Geophysics, Society of Exploration Geophysicists, vol. 75, No. 3, May-Jun. 2010, pp. E153-E160 (8 pages).

Wu, Peter, et al., "A Case of Near-Borehole Shear Velocity Alteration", SPWLA 34th Annual Logging Symposium, Jun. 1993, pp. 1-12 (12 pages).

Zeroug, Smaine, et al., "Monopole radial profiling of compressional slowness", SEG/New Orleans 2006 Annual Meeting, 2006, pp. 354-358 (5 pages).

International Search Report and Written Opinion of the International Searching Authority issued in corresponding International Application No. PCT/US2022/053656, mailed Apr. 24, 2023 (16 pages).

* cited by examiner

METHOD TO DETERMINE DRILLING-INDUCED ROCK DAMAGE

CROSS REFERENCE TO RELATED APPLICATION

This application claims from the benefit of Application CN 202111603470.3 filed on Dec. 24, 2021 in China. The entire contents of this application are incorporated herein by reference in their entirety.

BACKGROUND

When a wellbore is drilled, the surrounding rock may be damaged due to the mechanical stress induced by the drill and the, in situ, stress of the rock formation interacting with the wellbore. Locating and characterizing regions of drilling-induced rock damage surrounding the wellbore may help predict potential risks, such as wellbore collapse or deformation, when drilling deeper sections of the wellbore. Further, locating and characterizing drilling-induced rock damage may help in planning the completion strategy for the wellbore to extend the life of the wellbore and increase its cumulative hydrocarbon production.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method of determining a drilling-induced rock damage map. The method includes obtaining a sonic dataset, including sonic waveforms recorded at a plurality of source-receiver separations for a plurality of source positions along an axis of a wellbore. The method further includes determining a log of a first metric using the sonic dataset and determining a map of a second metric using the sonic dataset. The method still further includes determining the drilling-induced rock damage map based, at least in part, on the log of the first metric and the map of the second metric.

In general, in one aspect, embodiments relate to a non-transitory computer readable medium storing instructions executable by a computer processor. The instructions include functionality for receiving a sonic dataset, including sonic waveforms recorded at a plurality of source-receiver separations for a plurality of source positions along an axis of a wellbore. The instructions further include determining a log of a first metric using the sonic dataset and determining a map of a second metric using the sonic dataset. The instructions still further include determining the drilling-induced rock damage map based, at least in part, on the log of the first metric and the map of the second metric.

In general, in one aspect, embodiments relate to a system including a sonic tool and a computer system configured to receive a sonic dataset from the sonic tool, including sonic waveforms recorded at a plurality of source-receiver separations for a plurality of source positions along an axis of a wellbore. The computer system is further configured to determine a log of a first metric using the sonic dataset and determine a map of a second metric using the sonic dataset. The computer system is still further configured to determine a drilling-induced rock damage map based, at least in part, on the log of the first metric and the map of the second metric.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a sonic waveform" includes reference to one or more of such waveforms.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-6, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

A side effect of drilling may be the generation of drilling-induced damage to the rock formation (hereinafter also "formation" or "rock") surrounding the wellbore. The extent and severity of drilling-induced damage may depend upon the drilling parameters and characteristics of the formation and may inform decisions related to completing, e.g., casing or fracturing the wellbore. Disclosed herein are methods and systems for determining a drilling-induced rock damage map from a sonic dataset using processing methods that assume unvarying sonic velocities with distance away from the wellbore and processing methods that assume varying sonic velocities with distance away from the wellbore.

Figure 1:
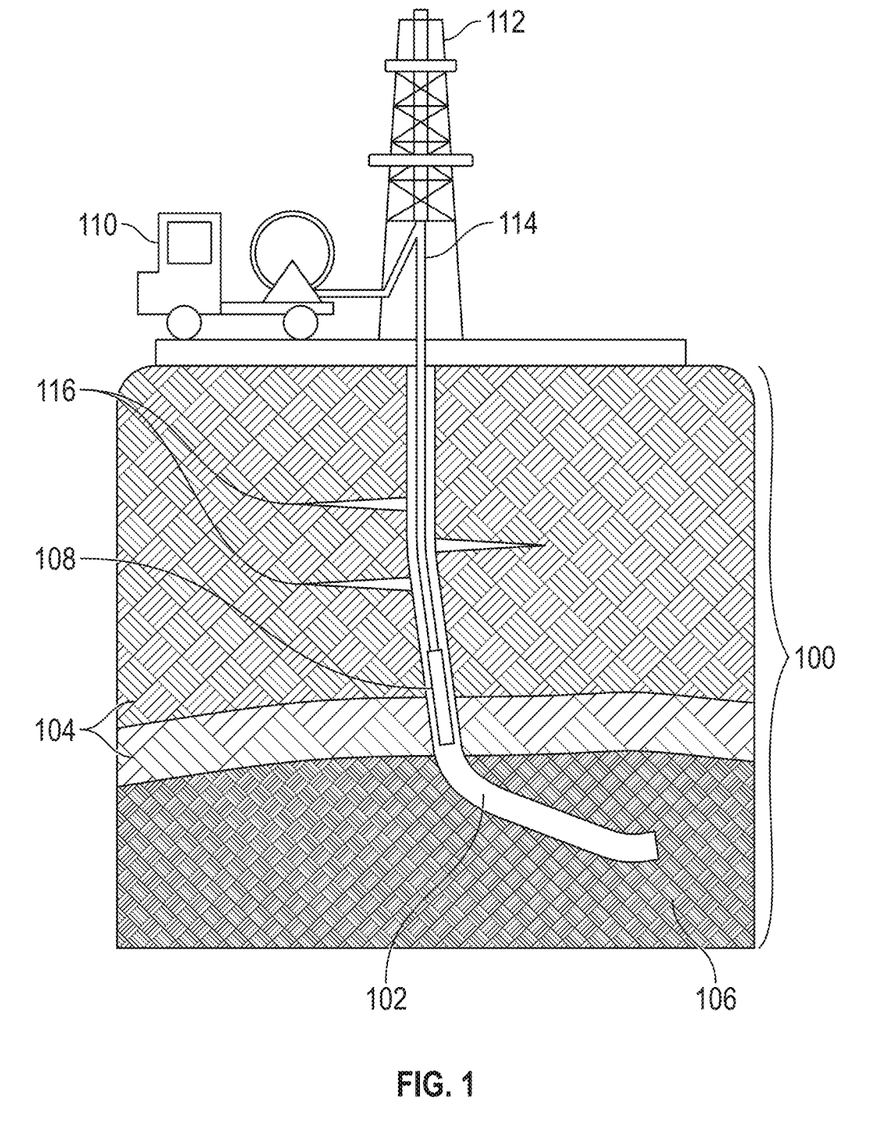
FIG. 1 depicts a wellbore in accordance with one or more embodiments.

FIG. 1 depicts a subterranean region (100) that contains a wellbore (102), in accordance with one or more embodiments. The wellbore (102) may traverse various rock formations (104) that may include cap rock to ultimately penetrate a hydrocarbon reservoir (106). Downhole tools (108) may be lowered into a wellbore (102) to acquire metrics of the wellbore (102) and/or the rock (104) surrounding the wellbore (102) in the subterranean region (100). A downhole tool (108) may be supported by a truck (110) and derrick (112) above ground wherein the truck (110) attached to a conveyance mechanism (114) is used to lower the downhole tool (108) into the wellbore (102). For example, the conveyance mechanism may be wireline, a coiled tubing, or a drillpipe that may include means to provide power to the downhole tool (108) and a telemetry channel from the downhole tool (108) to the surface.

As the wellbore (102) is being drilled, drilling-induced rock fractures (116) (hereinafter also "rock fractures", "rock damage", and "damaged rock") may manifest at various depths along the wellbore (102) and may extend radially away from the wellbore (102) into neighboring rock (104) as a stress relief mechanism. Drilling-induced fractures (116) may alter the physical characteristics of the rock formation (104) penetrated by the rock fractures (116). Drilling-induced fractures (116) may lead to wellbore instability and drilling risks for deeper sections of the wellbore (102) and require risk-mitigating operations. Further, drilling induced damage may lead to increased sand production ("sanding") reducing the productive life of a wellbore (102) and detrimentally effecting production equipment such as pumps.

Figure 2:
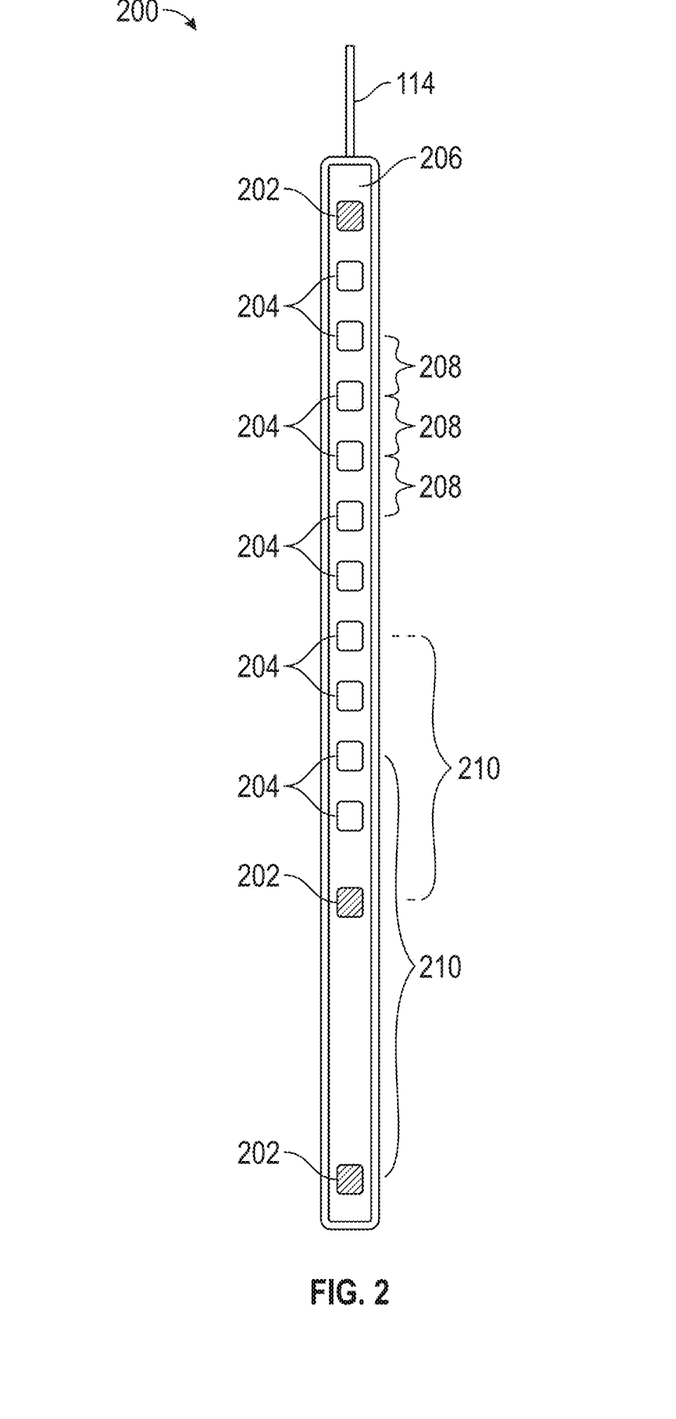
FIG. 2 depicts a sonic tool in accordance with one or more embodiments.

FIG. 2 depicts a sonic tool (200), in accordance with one or more embodiments. In general, sonic tools include at least one source (202) and an array of receivers (204). The source (202) emits sonic waves into the rock formation (104) surrounding the wellbore (102) that are subsequently detected and recorded by the receivers (204). The velocity of sonic wave propagation in the rock (104) may be determined from the sonic waves recorded by the receivers (204). Sonic waves may propagate more slowly in damaged rock (116) than in undamaged rock (104). Thus, the propagation velocity of sonic waves may be used to distinguish rock (104) that has sustained drilling-induced damage from rock (104) that has not.

In the embodiment shown in FIG. 2, the sonic tool (200) includes a plurality of sources (202) and a plurality of evenly spaced receivers (204) mounted to a pipe (206) that is attached to the conveyance mechanism (114). In other embodiments, the receivers (204) may be unevenly spaced. Further, although ten receivers (204) are shown in FIG. 2, in some embodiments there may be a greater or lesser number of receivers (204). An inter-receiver separation distance (208) (hereinafter also "inter-receiver separation") exists between any two receivers (204) and a source-receiver separation distance (210) (hereinafter also "source-receiver separation") exists between any source (202) and any receiver (204). Each source (202) may be a monopole, a dipole, or a quadrupole. A sonic tool (200) may include a monopole, a dipole, or a quadrupole individually or in any combination. Sonic tools (200) may be conveyed on wireline, coiled tubing or drillpipe, and may be used after a wellbore (102) has been drilled, or during the drilling of the wellbore (102).

A monopole source (202) typically radiates sonic waves with frequencies between 8 kHz and 20 kHz, although a source (202) with both higher and lower frequencies are sometime deployed. The sonic waves are generated at an activation location and travel into a portion of the rock (104) surrounding the wellbore (102) and are received by a plurality of receivers (204). Each of the plurality of receivers (204) record a time-series of sonic waves in amplitude called "waveforms".

Figure 3A:
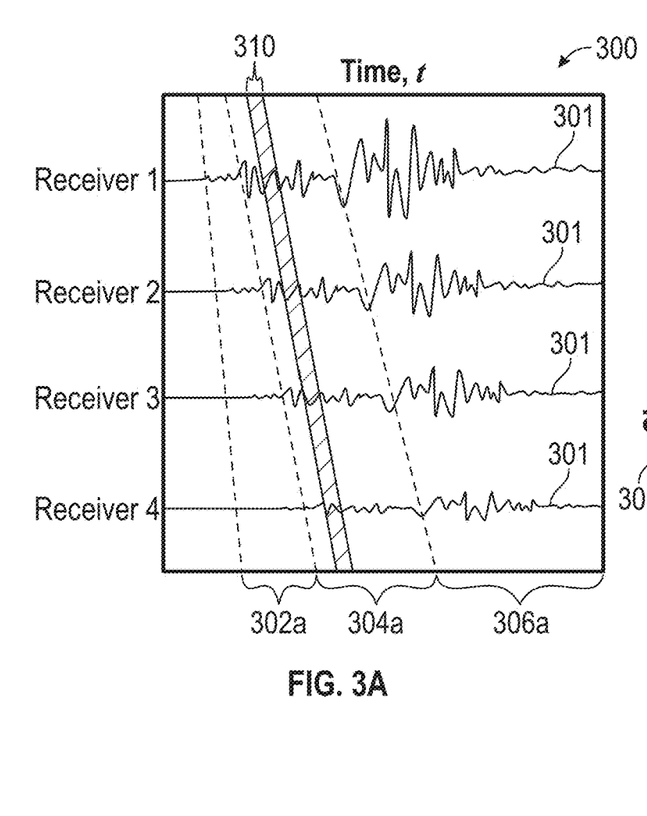
FIG. 3A shows waveforms in accordance with one or more embodiments.

A set of waveforms (301) from a portion of a sonic dataset (300) is shown in FIG. 3A. Additional portions of the sonic dataset (300) may be acquired by moving the sonic tool (200) along the axis (hereinafter also "depth") of the wellbore (102) to an alternate activation location and again emitting sonic waves. Moving the sonic tool (200) causes the sources (202) and receivers (204) to move in unison, such that source-receiver separations (210) and inter-receiver separations (208) remain unchanged but sonic waves emitted from the source (202) now travel through a different portion of the wellbore-neighboring rock (104) than before. The resulting plurality of portions of the sonic dataset (300) maybe combined to form the complete sonic dataset (300) (hereinafter "sonic dataset").

Specifically, FIG. 3A shows waveforms (301) acquired for receivers 1 through 4 mounted on a sonic tool (200) lowered into a wellbore (102) for a single activation location. When receivers (204) record the waveforms (301) of the received sonic waves, a plurality of wave types are detected. Compressional waves (hereinafter "P-waves") propagate through rock (104) and the wellbore fluid with a direction of oscillation parallel to the propagation direction of P-waves. Typically, P-waves travel faster than other types of waves and arrive at receivers (204) first as shown by the P-wave time window ($302a$) in FIG. 3A. Shear waves (hereinafter "S-waves") propagate through rock (104) with a direction of oscillation perpendicular to the propagation direction of S-waves. S-waves propagate more slowly than P-waves and arrive at receivers (204) after the P-wave as shown by the S-wave time window (304a). Tube waves or Stoneley waves propagate along the wellbore-rock interface of a wellbore (102) with a direction of oscillation perpendicular to the propagation direction of Stoneley waves. Stoneley waves propagate more slowly than P-waves and S-waves and arrive at receivers (204) after both as shown by the Stoneley wave time window (306a).

A sonic dataset (300) may be used to determine a plurality of metrics that relate to the propagation velocity of the rock. For example, the propagation velocity of P-waves may be determined or P-wave slowness (defined as the reciprocal of velocity) may be determined. Velocity may be measured in feet per second or meters per second while slowness is often measured in microseconds per foot or microseconds per meter. Further, such metrics may be separated by wave type and presented in the form of sonic logs (308) (hereinafter also "logs") as shown in FIG. 3C. Specifically, FIG. 3C shows a P-wave slowness log (302b), an S-wave slowness log (304b), and a Stoneley wave slowness log (306b). A person of ordinary skill in the art will appreciate that a plurality of methods exist to transform the sonic dataset (300) acquired by the sonic tool (200) into a sonic log (308) of a metric. Any of these methods may be used without departing from the scope of the invention.

Figure 3B:
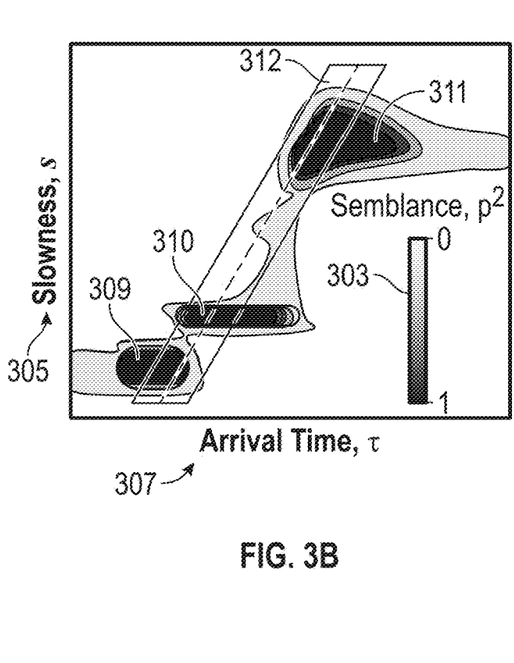
FIG. 3B shows waveform semblance in accordance with one or more embodiments.
Figure 3C:
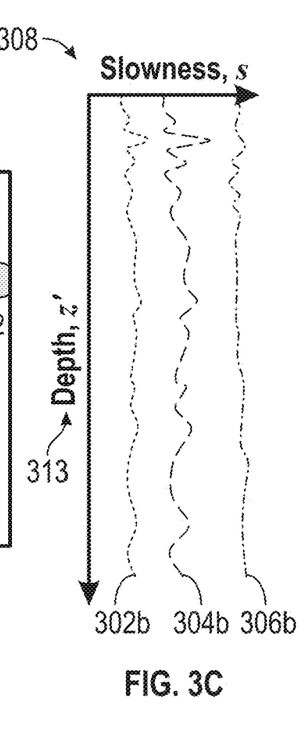
FIG. 3C shows logs in accordance with one or more embodiments.

FIGS. 3A-3C illustrate one method to determine sonic slowness (308) called slowness time coherence ("STC"), in accordance with one or more embodiments. Slowness time coherence aims to detect waveforms (301) that arrive at receivers (204) of the form:

$$r_m(t) = a[t - s(z_m - z_1) - \tau], 1 \leq m \leq M \quad \text{Equation (1)},$$

where m is a receiver (204), M is the total number of receivers (204), $z_m - z_1$ is the distance between the first receiver and the m-th receiver and t is time. T is the arrival time of a wavefront or wave type at the first receiver, s is slowness of the wavefront, a is amplitude, and $r_m(t)$ is a waveform (301) recorded by the m-th receiver (204) as shown in FIG. 3A. Equation (1) ignores any variation of the propagation velocity in the direction perpendicular to the wellbore (102) axis, or "radial" direction.

Given the sonic dataset (300), $\{r_m(t), 1 \leq m \leq M\}$, as shown in FIG. 3A, a semblance, $\rho^2$, over a set of time windows (310) may be determined as:

$$\rho^2(s, \tau) = \frac{\frac{1}{M} \int_{t=0}^{T_w} [\sum_{m=1}^{M} r_m[t + s(z_m - z_1) + \tau]]^2 dt}{\sum_{m=1}^{M} \int_{t=0}^{T_w} \{r_m[t + s(z_m - z_1) + \tau]\}^2 dt}, \quad \text{Equation (2)}$$

where $T_w$ is the width of a time window (310) and semblance, $\rho^2$, is the degree of coherence or similarity between waveforms (301) of an arrival at slowness, s, and arrival time, τ, and exists between 0 and 1. Semblance only equals 1 when the waveforms (301) received by all receivers (204) are identical in amplitude at the same time within the time window (310).

In accordance with one or more embodiments, the semblance, $\rho^2(s,\tau)$, for a single activation of the source (202) may be displayed as in FIG. 3B. FIG. 3B shows shaded contours (303) that indicate the value of semblance $\rho^2(s,\tau)$ as a function of slowness, s, indicated on the vertical axis (305), and arrival time, τ, indicated on the horizontal axis (307). Large values of semblance $\rho^2(s,\tau)$ correspond to different types of sonic waves. For example, the peak 309 of semblance corresponds to P-waves, the peak 310 corresponds to S-waves, and the peak 311 corresponds to Stoneley waves. The slowness of each peak may be determined using the vertical axis (305).

Actual sonic datasets (300) may be recorded for hundreds or thousands of source activation locations, each corresponding to a display similar to FIG. 3B. Automated peak-finding methods may be used to determine slowness values within a slowness-arrival time window (312) for each activation location. The slowness values for each activation location may then be plotted by wave type as sonic logs (308) as shown in FIG. 3C where the slowness, s, is indicated on the horizontal axis (312) and the source activation location, z', (depth) is indicated on the vertical axis (313).

Slowness logs (308) determined using STC provide only a value of slowness for each sonic wave type at each source activation location. The slowness logs (308) do not provide any information on how slowness or velocity may vary in the direction perpendicular to the wellbore (102) axis or with azimuth around the wellbore (102) axis. As such, it may be advantageous to use other methods to transform the sonic dataset (300) into sonic maps of a metric that allow for both axial and radial heterogeneity. In accordance with one or more embodiments, sonic maps (hereinafter also "maps") may provide values of sonic wave propagation velocity along the axis of the wellbore (102) and radially away from the center of the wellbore (102). Sonic maps may be determined using radial tomography methods that permit axial and radial heterogeneity.

For example, in accordance with one or more embodiments, a radial tomography method proposed by Hornby ("Tomographic reconstruction of near-borehole slowness using refracted borehole sonic arrivals", 1993. Geophysics, Vol. 58, pp. 1726-1738) may determine a P-wave slowness map along the axis of the wellbore (102) and radially away from the wellbore (102) from a sonic dataset (300) using an inversion scheme. The radial and depth coordinates within the rock (104) may be denoted by x=(r,z) and the unknown slowness function maybe denoted s(x). Further, assume there are M receivers (204) in the sonic tool (200) and the sonic dataset (300) consists of L source activation positions each with M receivers (204) recorded. The total number of sonic wave ray paths in the sonic dataset (300), then, is K=LM. The first break or earliest arrival times, assumed to be P-waves, may be recorded at the receivers (204) or may be determined from the sonic waveforms (301) and denoted $t_k$, k=1, ..., K. The arrival times, $t_k$, may be written as:

$$t_k = \int_{T_k(s)} s(x) du \quad \text{Equation (3)},$$

where du is arc length along the sonic wave ray path, denoted $T_k(s)$, between a source (202) and a receiver (204).

Determining the slowness function, s(x), from Equation (3) is a non-linear problem that may be solved using a sequence of ray tracing and linear inversions. The problem may be linearized using an initial slowness model, $\bar{s}(x)$, estimated from computations of wellbore fluid slowness, wellbore diameter, and undamaged rock slowness, or from the STC slowness log (308). Travel times produced by the initial slowness model, $\bar{s}(x)$, are estimated as:

$$\bar{t}_k \approx \int_{T_k(\bar{s})} \bar{s}(x) du \quad \text{Equation (4)}.$$

A discrete approximation is then created for the slowness function, s(x), using a system of linear equations across a grid that represents the wellbore-neighboring rock (104) where the sonic waves are emitted where the initial guess for each cell of the grid is the initial slowness model, $\bar{s}(x)$. Sonic wave rays are then traced through the slowness grid and first arrival travel times, $\bar{t}_k$, are estimated iteratively by:

$$\bar{t}_k^n = \Sigma_{j=1}^J \Delta a_{kj} \bar{s}_j^n \; k=1,2,\ldots,K \qquad \text{Equation (5)}$$

where $\Delta a_{kj}$ is the length of the ray k which intersects cell j, J is the total number of cells ray k intersects, n is the iteration number, and $\bar{s}_j^0 = \bar{s}_j$ is an initial estimate for the slowness of cell j. An objective function, which includes correction functions that may be estimated using the simultaneous iterative reconstruction technique, is then applied to each cell through which the k-th ray passes to ultimately estimate s(x) at each cell in the grid.

Another radial tomography method proposed by Zeroug et al. ("Monopole radial profiling of compressional slowness." *SEG Technical Program Expanded Abstracts* 2006. Society of Exploration Geophysicists, 2006. 354-358) may also determine a P-wave slowness map along the axis of the wellbore (102) and radially away from the wellbore (102) using an alternate inversion scheme. Source-receiver separation distance (210) is denoted $X_i$, i=1, ..., M where M is the total number of receiver pairs. Source-receiver separation distance (210), $X_i$, may then be related to rock layer thickness, $H_i$, and rock layer velocity, $V_i$, by:

$$X_i = 2\left[\frac{s}{\sqrt{\sqrt{\frac{v_f^2}{V_i^2}-1}}} + \sum_{j=1}^{i-1} H_j \frac{1}{\sqrt{\frac{V_f^2}{V_i^2}-1}}\right], \qquad \text{Equation (6)}$$

where $v_f$ is the velocity of the fluid within the wellbore (102).

Still another radial tomography method proposed by Zhang and Toksöz ("Nonlinear refraction traveltime tomography." *Geophysics* 63.5 (1998): 1726-1737) may determine a velocity map along the axis of the wellbore (102) and radially away from the wellbore (102) using a still further alternate inversion scheme. A shortest path raytracing method with an optimized node distribution within a grid that represents a rock formation (104) is used to calculate travel times and ray paths for any velocity model. The nonlinear regularized inverse problem minimizes the residuals of the objective function:

$$\Phi(m) = (1-\omega)\|d-G(m)\|^2 + \omega\|\hat{d}-\hat{G}(m)\|^2 + \tau\|Dm\|^2 \qquad \text{Equation (7)}$$

where d is the set of travel times, G(m) is the calculated set of travel times for the current model m, $\hat{d}$ is the gradient of the set of travel times, $\hat{G}(m)$ is the calculated gradient of the set of travel times, D is a regularization, $\tau$ is a smoothing trade-off parameter, and $\omega$ is a weighting factor.

Figure 4:
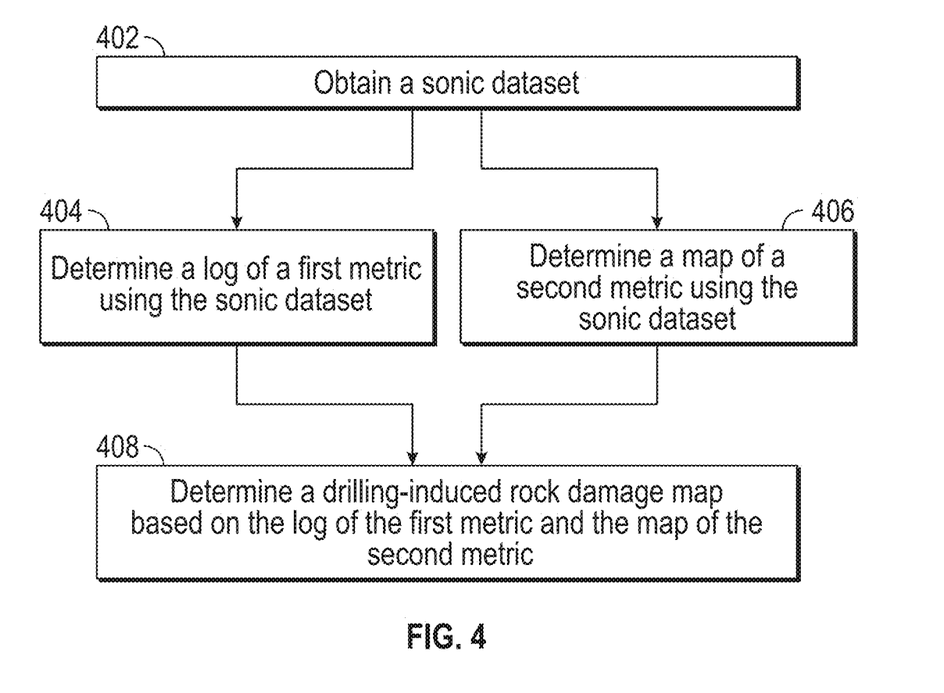
FIG. 4 shows a flowchart in accordance with one or more embodiments.

Because sonic waves travel slower in damaged rock (116) compared to undamaged rock (104), sonic logs (308) and sonic maps determined from a sonic dataset (300) may be a function of rock damage (116). FIG. 4 shows a flowchart to determine a drilling-induced rock damage map from a sonic dataset (300).

In Step 402, a sonic dataset (300) is obtained using a sonic tool (200) such as the one depicted in FIG. 2. Sonic tools (200) may record a sonic dataset (300) that are a time-series of sonic waves in amplitude, denoted waveforms (301), for each receiver (204). Although FIG. 3A shows only four waveforms (301), actual sonic datasets (300) may contain many more waveforms (301), typically 8 to 13 waveforms for each of one of thousands of source activation locations. For the sonic tool (200) to record a sonic dataset (300), the sonic tool (200) will be moved a plurality of times along the axis of the wellbore (102) and sonic waves emitted from a source (202) after each move.

In Step 404, a log (308) of a first metric is determined using the sonic dataset (300) obtained in Step 402. In some embodiments, a first metric may be slowness, velocity, or a function of slowness and/or velocity. Slowness time coherence as described previously in FIGS. 3A-3C may be used to determine a sonic log (308) of a metric which may or may not be separated by wave type. A person of ordinary skill in the art will appreciate that alternative methods to slowness time coherence may be used to determine a sonic log (308) of a first metric from a sonic dataset (300). The method used to determine the log (308) should in no way limit the scope of the invention disclosed herein.

In Step 406, a map of a second metric is determined using the sonic dataset (300) obtained in Step 402. In some embodiments, a second metric may be slowness, velocity, or a function of slowness and/or velocity where each metric may or may not be separated by wave type. A plurality of radial tomography methods as described above may be used to determine a map of a second metric from a sonic dataset (300). A person of ordinary skill in the art will appreciate that alternative radial tomography methods, as well as alternative methods that do not fall under radial tomography, may be used to determine a sonic map of a second metric from a sonic dataset (300). Further, although only methods to determine a two-dimensional map are described herein, the map may also be three-dimensional. A three-dimensional map may be determined along the axis of the wellbore (102), radially away from the center of the wellbore (102), and azimuthally around the wellbore (102). The method used to determine the map should in no way limit the scope of the invention disclosed herein.

In Step 408, a drilling-induced rock damage map (hereinafter also "rock damage map") is determined using the log (308) from Step 404 and the map from Step 406. The log (308) and the map may be compared at discrete depths along the axis of the wellbore (102) to determine the drilling-induced rock damage map. In one embodiment, the value of the log (308) at depth z may be subtracted from each radial value of the map at depth z to determine the rock damage map. The first metric of the log (308) and the second metric of the map may or may not be the same metric. Further, the first metric of the log (308) and/or the second metric of the map may or may not be normalized. Further still, a comparison may be performed over a depth window, a radial window, or an azimuth window where the values within each window may be averaged, minimized, or maximized before or after the log (308) and the map are compared. How the log (308) and the map are compared to determine the rock damage map should in no way limit the scope of the invention presented herein.

Figure 5:
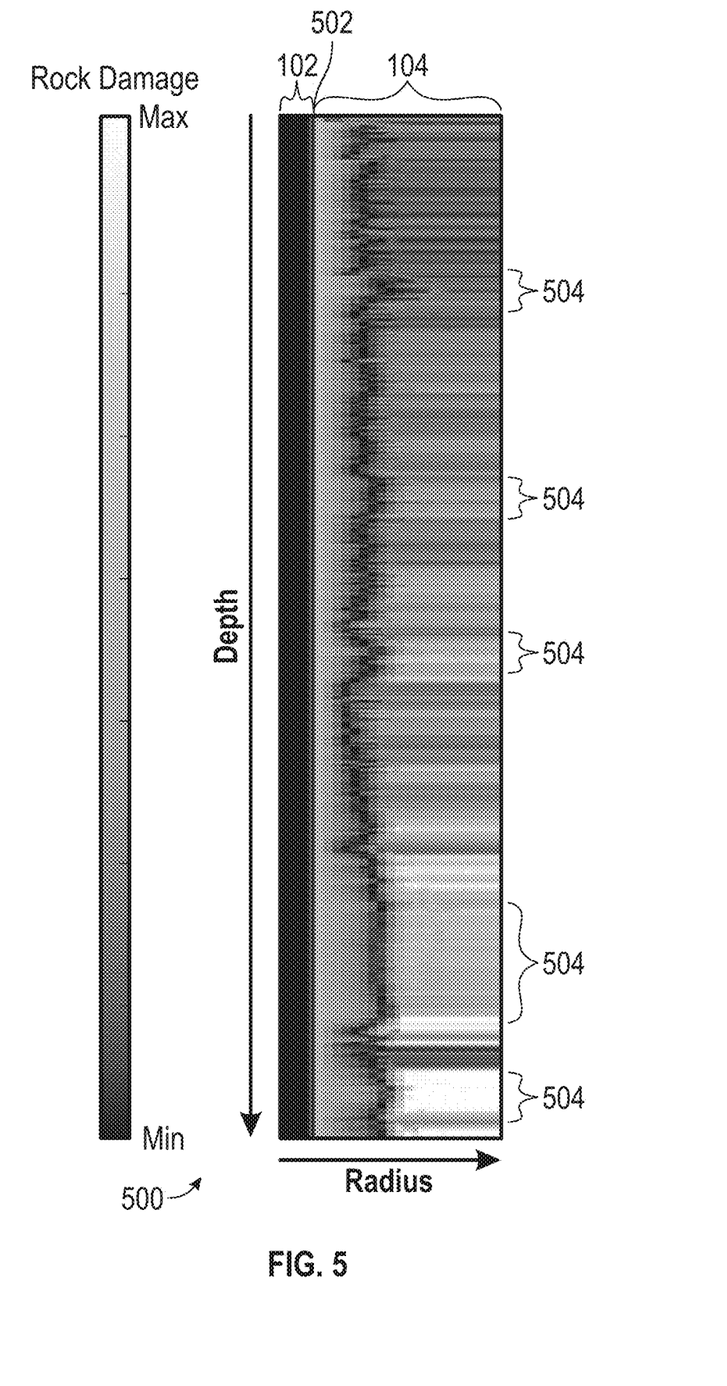
FIG. 5 shows a drilling-induced rock damage map in accordance with one or more embodiments.

FIG. 5 shows one embodiment of a display of a drilling-induced rock damage map (500) as a function of axial position or depth along a wellbore (102) and a radial distance from the center of the wellbore (102). In this embodiment, the maximum rock damage occurs along the wellbore-rock interface (502). The rock damage then reduces radially away from the wellbore (102). Further, FIG. 5 shows that rock damage extends further into the rock (104) at designated locations (504).

In accordance with one or more embodiments, a wellbore completion plan may now be determined and executed based, at least in part, on the rock damage map (500). Wellbore completion is the process of making a wellbore (102) ready for production after drilling operations are completed. Wellbores (102) in hard, undamaged rock (104)

may be completed without casing ("barefoot") as the support of casing may not be needed. In less competent rock, a predrilled liner may be used. The predrilled liner is prepared with multiple small drilled holes, then set across the production zone to provide wellbore stability and an intervention conduit if necessary. A pre-holed liner is often combined with openhole packers, such as swelling elastomers, mechanical packers or external casing packers, to provide zonal segregation and isolation. Slotted liners may be selected as an alternative to predrilled liners. A slotted liner is metal pipe machined with multiple longitudinal slots, for example 2 mm×50 mm, spread across the length and circumference of each section of pipe.

Wellbores (102) with drilling-induced rock damage (116) may be prone to producing sand entrained in the hydrocarbon flow ("sanding"). In such cases, a sand screen liner may be required to mechanically hold back the movement of formation sand. There are many variants of openhole sand control, including stand-alone screens, openhole gravel packs, and expandable screens. Stand-alone screens are typically wire-wrap or woven metal cloth wrapped around a base pipe. Expandable screens are run to depth before being mechanically swaged to a larger diameter, ideally until they contact the wellbore wall.

Wellbores (102) without drilling-induced rock damage (116) may require stimulation to produce efficiently. This may include cementing casing in place and perforating the casing with small shaped-explosive charges and generating hydraulic fractures within the rock (104) by elevating the pressure within the perforated section of the wellbore (102).

The rock damage map (500) may provide insight into which wellbores (102), or which sections of wellbores (102) require perforation and fracturing and which require sand screens or sand packs to mitigate sanding.

Figure 6:
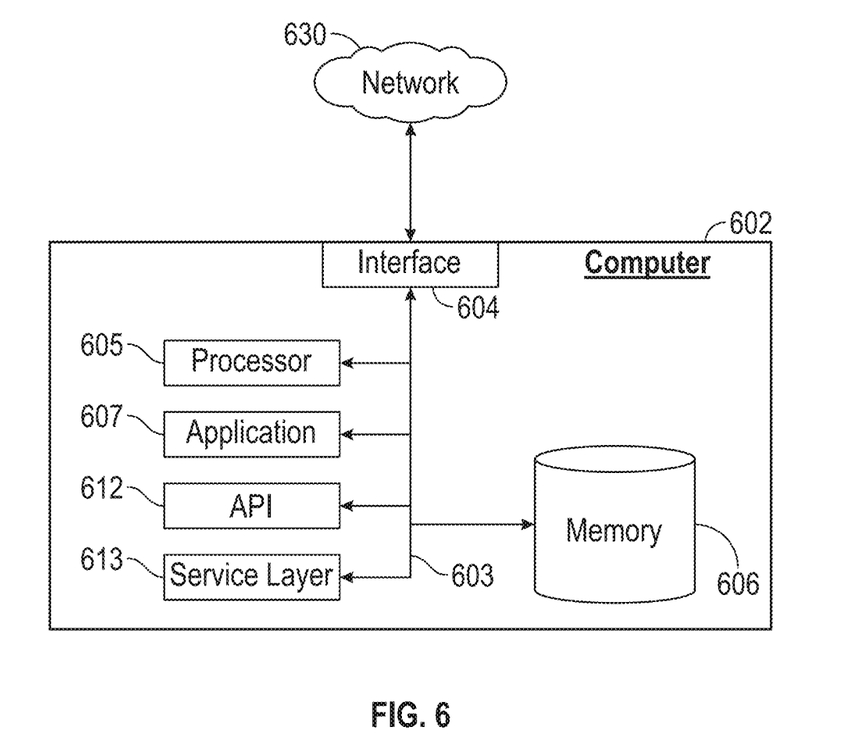
FIG. 6 shows a computer system in accordance with one or more embodiments.

FIG. 6 depicts a block diagram of a computer system (602) used to provide computational functionalities associated with described algorithms, methods, functions, processes, flows, and procedures as described in this disclosure, according to one or more embodiments. The illustrated computer (602) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or another suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604) includes logic encoded in software or hardware (or a combination of software and hardware) and operable to communicate with the network (630). More specifically, the interface (604) may include software supporting one or more communication protocols, such as the Wellsite Information Transfer Specification (WITS) protocol, associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing a computer (602), wherein each computer (602) communicates over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of determining a drilling-induced rock damage map, comprising:
obtaining, using a sonic tool, a sonic dataset comprising a set of sonic waveforms recorded at each of a plurality of axial source positions along an axis of a wellbore, wherein the sonic tool comprises at least one sonic source and a plurality of sonic receivers, and
wherein each of the set of sonic waveforms comprises a recording, by one of the plurality of sonic receivers, of sonic waves emitted by the sonic source;
determining, using a slowness time coherence method, a log of a P-wave slowness from the sonic dataset;
determining, using a tomographic method, a map of a P-wave velocity from the sonic dataset; and
determining the drilling-induced rock damage map by subtracting the log of the P-wave slowness from the map of the P-wave velocity at a plurality of depths along the axis of the wellbore.

2. The method of claim 1, further comprising:
determining a wellbore completion plan based, at least in part, on the drilling-induced rock damage map; and
executing the wellbore completion plan,
wherein executing the wellbore completion plan comprises installing, in the wellbore, at least one downhole tool.

3. The method of claim 1, wherein the log of the P-wave slowness comprises a single value for each of the plurality of axial source positions along the wellbore.

4. The method of claim 1, wherein the tomographic method uses P-wave first break travel times.

5. The method of claim 1, wherein the tomographic method comprises a radial tomography method.

6. The method of claim 1, wherein the map of the P-wave velocity is a function of an axial position along the wellbore and a radial distance from a center of the wellbore.

7. The method of claim 2, wherein the at least one downhole tool comprises an expandable screen.

8. A non-transitory computer readable medium storing instructions executable by a computer processor, the instructions comprising functionality for:
receiving, from a sonic tool, a sonic dataset, comprising a set of sonic waveforms recorded at each of a plurality of axial source positions along an axis of a wellbore, and
wherein the sonic tool comprises at least one sonic source and a plurality of sonic receivers, and
wherein each of the set of sonic waveforms comprises a recording, by one of the plurality of sonic receivers, of sonic waves emitted by the sonic source;
determining, using a slowness time coherence method, a log of a P-wave slowness from the sonic dataset;
determining, using a tomographic method, a map of a P-wave velocity from the sonic dataset;
determining a drilling-induced rock damage map based, by subtracting the log of the P-wave slowness from the map of the P-wave velocity at a plurality of depths along the axis of the wellbore;
determining a wellbore completion plan based, at least in part, on the drilling-induced rock damage map; and
wherein the wellbore completion plan comprises plans for installing, in the wellbore, at least one downhole tool.

9. The non-transitory computer readable medium of claim 8, wherein the tomographic method uses P-wave first break travel times.

10. The non-transitory computer readable medium of claim 8, wherein the log of the P-wave slowness comprises a single value for each of the plurality of axial source positions along the wellbore.

11. The non-transitory computer readable medium of claim 8, wherein the tomographic method comprises a radial tomography method.

12. The non-transitory computer readable medium of claim 8, wherein the map of the P-wave velocity is a function of an axial position along the wellbore and a radial distance from a center of the wellbore.

13. A system, comprising:
a sonic tool, configured to record a sonic dataset, comprising a set of sonic waveforms recorded at each of a plurality of axial source positions along an axis of a wellbore,
   wherein the sonic tool comprises at least one sonic source and a plurality of sonic receivers, and
   wherein each of the set of sonic waveforms comprises a recording, by one of the plurality of sonic receivers, of sonic waves emitted by the sonic; and
a computer system configured to:
   receive the sonic dataset from the sonic tool;
   determine, using a slowness time coherence method, a log of a P-wave slowness from the sonic dataset;
   determine, using a tomographic method, a map of P-wave velocity from the sonic dataset;
   determine a drilling-induced rock damage map by subtracting the log of the P-wave slowness from the map of the P-wave velocity at a plurality of depths along the axis of the wellbore; and
   determine a wellbore completion plan based, at least in part, on the drilling-induced rock damage map.

14. The system of claim 13, wherein the tomographic method uses P-wave first break travel times.

15. The system of claim 13, wherein the tomographic method comprises a radial tomography method.

16. The system of claim 13, wherein the map of the P-wave velocity is a function of an axial position along the wellbore and a radial distance from a center of the wellbore.

17. The system of claim 13, further comprising: a conveyance mechanism attached to a downhole tool configured to execute the wellbore completion plan,
   wherein executing the wellbore completion plan comprises installing, in the wellbore, at least one downhole tool.

18. The system of claim 17, wherein the at least one downhole tool comprises an expandable screen.

* * * * *